United States Patent [19]

Brown et al.

[11] 3,896,312

[45] July 22, 1975

[54] PETROLEUM IDENTIFICATION

[76] Inventors: Christopher W. Brown, R. R. 1, Box S-12, Saunderstown, R.I. 02874; Mark Ahmadjian, 10 Blackamore Ave., Cranston, R.I. 02910; Patricia F. Lynch, 320 Boston Neck Rd., Narragansett, R.I. 02882

[22] Filed: June 7, 1974

[21] Appl. No.: 477,414

[52] U.S. Cl............................. 250/343; 235/151.35
[51] Int. Cl. ............................................ G01n 21/26
[58] Field of Search ........... 250/343, 344, 345, 346, 250/373; 235/151.35

[56] References Cited
UNITED STATES PATENTS

| | | | |
|---|---|---|---|
| 2,883,343 | 4/1959 | Favre | 250/345 |
| 3,717,809 | 2/1973 | Laukien | 235/151.35 |

*Primary Examiner*—James W. Lawrence
*Assistant Examiner*—C. E. Church
*Attorney, Agent, or Firm*—Thompson, Birch, Gauthier & Samuels

[57] ABSTRACT

A method for comparing the infrared spectrum of an unidentified oil sample to the infrared spectra of a plurality of identified oil samples is disclosed herein. Also disclosed is a method for taking account of the background interference of testing cells when sodium chloride cells are employed for preparing or measuring the infrared spectra. Also disclosed is a method of using aluminum foil strips to separate oil samples from an aqueous environment and as sample cells in the preparation of infrared spectra.

11 Claims, 5 Drawing Figures

PATENTED JUL 22 1975 3,896,312

SHEET 1

PETROLEUM IDENTIFICATION

BACKGROUND OF THE INVENTION

This invention relates generally to identification of the source of oil spills and leaks by comparison of an unidentified oil sample to a plurality of identified or reference samples. The increasing number of oil spills during the past few years has led to stepped-up efforts to find suitable analytical techniques to characterize hydrocarbons, particularly in petroleum products. Ideally, every crude oil, fuel oil, and residual distillate should be characterized by some analytical feature so that they can be identified rapidly and unambiguously. Several methods have been proposed to provide such an identification. These include infrared spectroscopy, ultra-violet fluroescence spactroscopy gas chromatography, trace element analysis, and labelling with trace materials. Currently, it is the general opinion that several techniques are needed to provide an unambiguous identification. However, it has now been found that with appropriate sampling techniques and data analysis infrared spectroscopy can be used to identify the type and source of a reasonably large number of petroleum samples.

DESCRIPTION OF PRIOR ART

The characterization of hydrocarbon mixtures by means of comparison of infrared spectra is disclosed in U.S. Pat. No. 2,648,010. More recent articles in the scientific literature reveal various efforts to actually apply this process on a practical scale as, for example, in tracing the source of an practical scale as, for example, in tracing the source of an oil leak on land or identifying the source of an oil spill at sea. Articles appearing in the Journal of the Petroleum Institute, Vol. 58, p. 63 (1972) and Vol. 54, p. 288 (1968) and the Journal of Environmental Science and Technology, Vol. 3, p. 150 (1969) disclose that infrared spectra of various oils analyzed over particular ranges of frequencies demonstrate certain recurring characteristics or "signatures" which can be used to distinguish the oils. However, the techniques heretofore employed for obtaining and analyzing data have proven cumbersome and incapable of making fine differentiations between oils having similar constituents.

OBJECTS OF INVENTION

Accordingly, it is a primary object of the present invention to provide a method for analyzing infrared spectra such that an unidentified oil sample can be quickly and accurately compared with a plurality of identified or reference samples and be distinguished even among identified samples of very similar constituency.

It is another object of the present invention to provide a method of analyzing the infrared spectra of oil samples which is able to easily and accurately take account of variations in the testing parameters, in particular cell thickness and background absorbance of the test cells, so as to standardize the test results insofar as possible.

It is also an object of the present invention to provide a method of obtaining essentially water-free oil samples from an aqueous environment to facilitate the preparation of infrared spectra.

It is further an object of the present invention to provide a method for analyzing the infrared spactra of oil samples which utilizes data processing techniques.

These and other objects and advantages of the present invention will become more apparent as the following description proceeds.

BRIEF DESCRIPTION OF DRAWINGS

The present invention may be more readily described by reference to the accompanying drawings in which.

DESCRIPTION OF PREFERRED EMBODIMENT

The method of the present invention differs from prior efforts at using infrared spectra for characterising oil samples principally in the selection of a lower and narrower frequency band for analysis than has previously been employed, in the use of optical equipment having at least a certain degree of resolution, and in the means for analyzing and evaluating the resulting data. In particular, it has been found in accordance with the present invention that crude oils from various parts of the world demonstrate as many as twenty or more highly characteristic slope transitions or "valleys" in their infrared spectra over the frequency range of about 600–1200 $cm.^{-1}$, especially between about 650–1000 $cm.^{-1}$.

Figure 1:
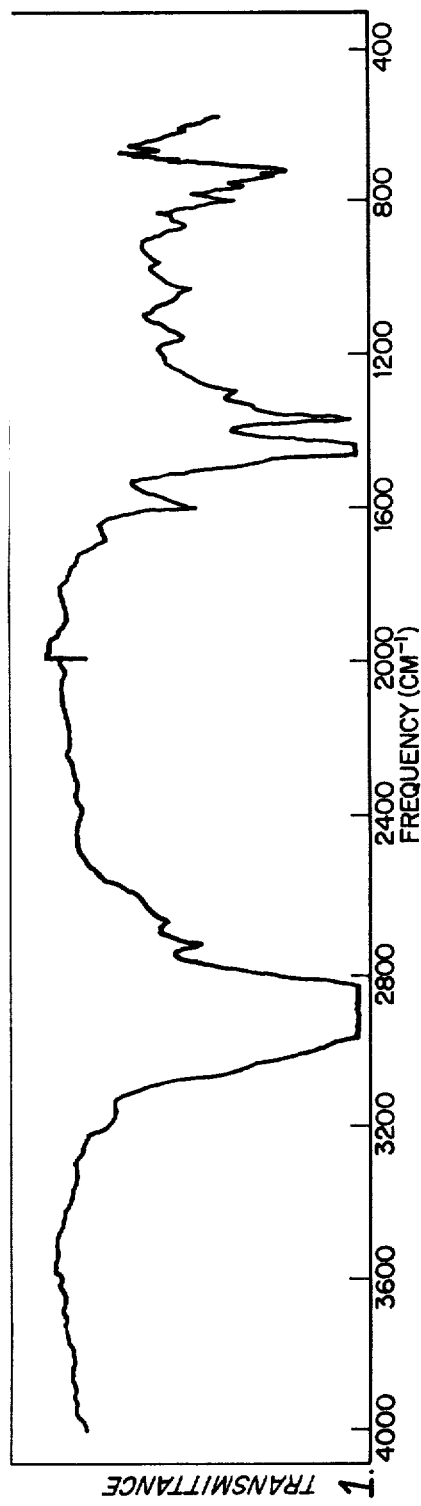
FIG. 1 is an infrared spectrum of a crude oil sample taken over the frequency range of about 400–4000 $cm.^{-1}$.

FIG. 1 illustrates an infrared spectrum of an Ecuadorian crude oil over the frequency range of 400–4000 $cm.^{-1}$ using a sodium chloride test cell and a sample thickness of 0.1 mm. in the manner hereinafter described. It will be observed that although the complete spectrum demonstrates a great number of valleys, there is an especially high concentration in the frequency range of about 600– 1200 $cm.^{-1}$. By the use of optical equipment capable of a resolution of at least as low as about 3 wavenumbers and preferably as low as 2 wavenumbers or less in combination with an instrument having a linear wavelength display so as to expand the 600–1200 $cm.^{-1}$ region as much as possible, it has been found that the valleys in this region can be resolved despite their high concentration. Moreover, it has been found that this group of valleys is highly characteristic of the various oil samples tested. The latter point is important because a valley which occurs at a particular frequency only in some samples cannot be used as a reliable basis for comparison to other samples. In the present invention, it has been found that at least about 20 valleys are almost invariably found in the frequency region of 600–1200 $cm.^{-1}$ in the infrared spectra of crude and many refined oils. It is also advantageous to be able to concentrate analysis on such a relatively narrow frequency range because the spectrometry equipment can be adjusted to optimize resolution and accuracy in this region. Thus, one of the novel features of the present invention is the discovery that the infrared spectra of oil samples in the frequency range of 600–1200 cm.$^{-1}$ provide reliable "fingerprints" of the oils they represent.

Figure 2:
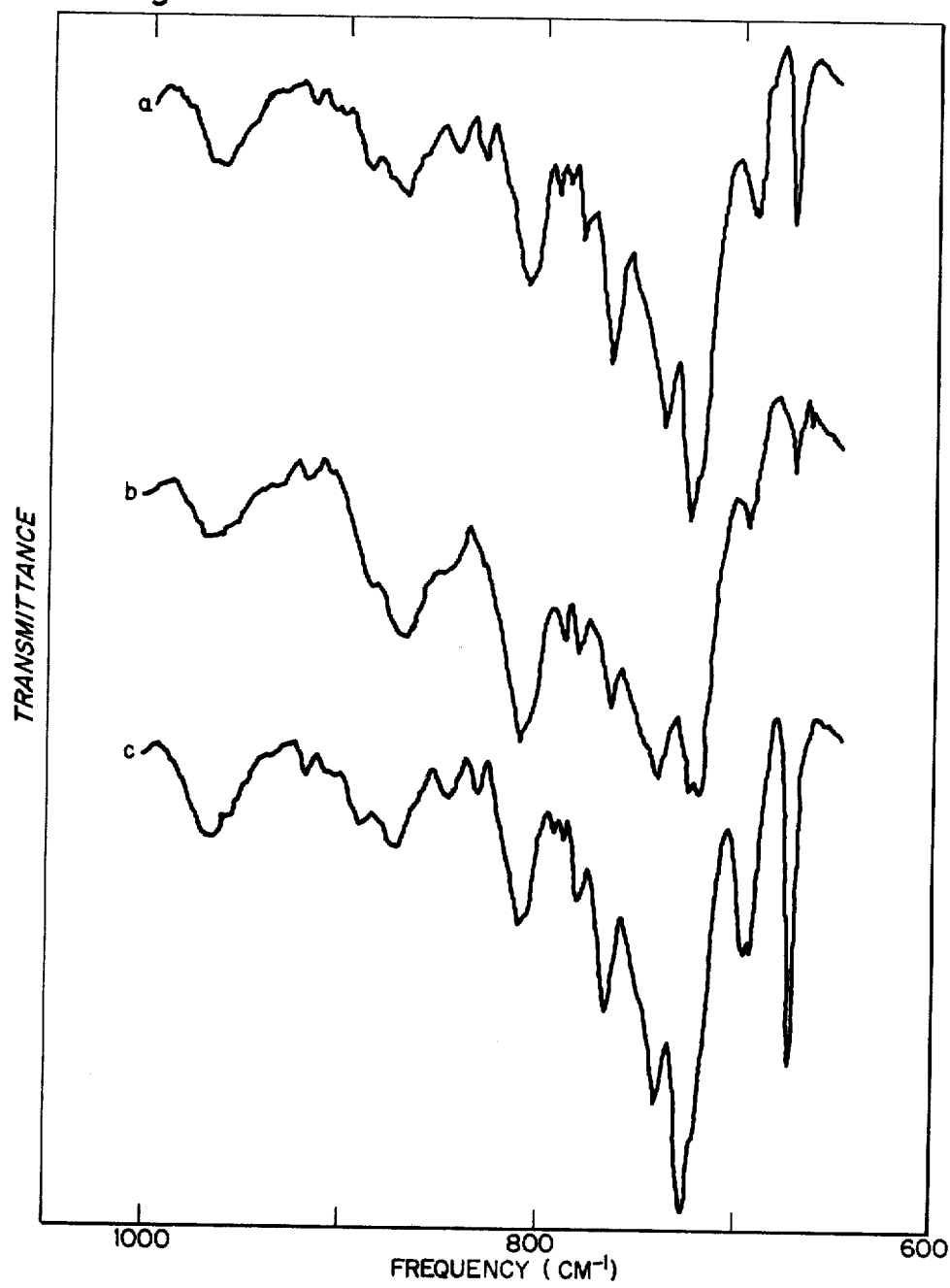
FIG. 2 is a vertically-displaced graph showing the infrared spectra of three crude oil samples.

FIG. 2 is a vertically-displaced graph of the infrared spectra of three oil samples in the frequency range of 600–1000 cm.$^{-1}$ on a linear frequency scale. The graph denoted $a$ represents a Nigerian crude, $b$ an Ecuadorian crude, and $c$ a Rocky Mountain crude. All three sample were measured using a sodium chloride cell in the manner hereinafter described. This figure illustrates more clearly the 20 or so characteristic valleys occurring in the preferred frequency range of 650–1000 cm.$^{-1}$. Of course, the precise location of each valley along the frequency band will tend to shift slightly to a higher or lower frequency depending on the calibration of the instruments for each test. However, the location of each valley relative to other valleys will remain constant.

In preparing the infrared spectra of the various oil samples, occasionally one or more valleys will not appear at all. This can be the result of inadequate resolution or loss of the particular component in the oil sample ordinarily responsible for that valley, for example by weathering of the sample on the open sea. When this occurs, comparison of absorbances at that frequency for that sample as hereinafter described should be eliminated from the analysis. However, because of the relatively large number of other characteristic valleys for each sample, this does not adversely affect the final analytical results.

The general shape and breadth of the valleys are sufficiently distinctive that, with some practice, it is possible to broadly classify an unidentified sample as crude, kerosene/No. 2 fuel oil, or residual distillate by cursory visual inspection. However, only be means of the analytical method of the present invention involving comparison of relative intensities of the characteristic valleys is it possible to distinguish between two identified samples of similar constitution in relation to a third unidentified sample.

The first step in the process of the present invention is to prepare a reference library of identified oil samples as a basis of comparison. The precise number of reference samples required depends on how narrowly it is possible to fix the source of the unidentified sample. For example, if it is established that an unidentified sample has come from one of three oil tankers, then only the three reference samples are needed for comparison to the unidentified sample. On the other hand, if an unidentified sample cannot be traced to a limited number of sources, it is necessary to have a library of reference samples representative of oils from all over the world. For each reference sample, an infrared spectrum is prepared, and the percent-transmittance at each of the characteristic frequencies is measured. By reference to the calibration of the instrument, each percent-transmittance reading is converted to an absorbance value according to the formula:

$$A_{(f)} = -\log \frac{I_{(f)}}{I_{(f)o}} \quad (1)$$

wherein $A_{(f)}$ = absorbance at frequency $f$, $I_{(f)o}$ = the intensity of the infrared beam entering the oil sample at frequency $f$, and $I_{(f)}$ = the intensity of the infrared beam emerging from the sample at frequency $f$. The ratio $I/I_o$ is essentially the percent-transmittance divided by 100.

Absorbance, however, is a function of the length of the oil path through which the infrared beam has travelled, the concentration of the oil sample, and a value called "absorptivity" which is a constant for a particular oil at a particular frequency. This relationship can be illustrated by the formula:

$$A_{(f)} = (l)(c)(a_{(f)}) \quad (2)$$

wherein $A_{(f)}$ = absorbance at frequency $f$, $l$ = length of the infrared light path through the oil sample, $c$ = the concentration of the oil sample which is ordinarily about 1.0 for a relatively pure sample, and $a_{(f)}$ = absorptivity of the oil at frequency $f$.

Ideally, therefore, oil samples are compared by comparing value of $a_{(f)}$ at a plurality of characteristic frequencies. At each such characteristic frequency, the absorptivity would be calculated by dividing the absorbance, determined as heretofore described, by the concentration (which is approximately 1.0 ) and by the path length. However, the path lengths in the cells conventionally used for obtaining infrared spectra are quite small on the order of about 0.1 mm. and in some cases, difficult to measure. The length of the cells themselves are far from uniform, and the path length through the oil sample contained in the cell is somewhat less than the cell length. Because of the small numbers involved, even a very small measuring error in absolute terms can result in introducing a significant error into calculations of absorptivities for the purpose of comparison. A method has now been devised for eliminating the path length factor in comparing absorptivities. This method is illustrated by a block diagram in FIG. 3.

In accordance with the present invention, the absorbances calculated for each reference sample at each characteristic frequency are converted to "pseudo absorptivities" by dividing the absorbances for each reference sample by the approximate path length of the sample used for obtaining the infrared spectrum. Although this approximate path length will be eliminated from the final results as hereinafter described, it is convenient to employ pseudo absorptivities so that subsequent mathematical operations will be performed on numbers having the same general order of magnitude.

The next step is to prepare an infrared spectrum of an unidentified oil sample and, as heretofore described, calculate a pseudo absorptivity for the sample at each characteristic frequency. The relationship between the unidentified sample and each of the reference samples can then be defined by a ratio at each characteristic frequency of the pseudo absorptivity of the unidentified sample to that of a particular reference sample. In theory, if two samples are identical, the ratios of pseudo absorptivities at all of the characteristic frequencies will be the same. Additionally, if the actual oil path lengths of the two samples are identical, all of the ratios will be 1.0.

Figure 3:
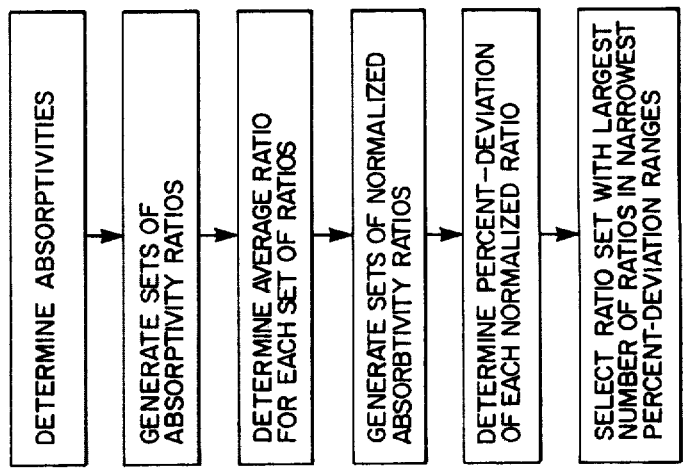
FIG. 3 is a block diagram of the analytical method used for identifying oil samples.

According to the method of the present invention, the unknown factor of path length is eliminated from the analysis by converting all of the ratios of pseudo absorptivities to "normalized" ratios. A given set of pseudo absorptivity ratios is converted into a set of normalized ratios which are independent of path length by the following steps as illustrated in FIG. 3;

1. all of the ratios in a set of ratios which compares the unidentified sample to one reference sample are added together to yield a ratio sum;

2. the ratio sum is divided by the number of ratios in the set to yield an average ratio for the set; and, 3. each ratio in the set is divided by the average ratio for the set to yield a set of normalized ratios.

It will be appreciated that in dividing each ratio in a set by the average ratio for that set, the path lengths of the unidentified sample and the reference sample are respectively cancelled. Again considering the ideal, if two samples being compared are identical, the average ratio for a set will be the same as each of the individual ratios, therefore the normalized ratios will all be 1.0. Thus, the deviation of each normalized ratio in a set from the ideal of 1.0 provides a standard for comparing the unidentified sample to a reference sample.

Accordingly, the next step in the method of the present invention is to generate a set of normalized absorptivity ratios of unidentified sample to reference sample for each reference sample and to determine the absolute value of the difference between each of those normalized ratios and 1.0. This latter value when multiplied by 100 yields a percent-deviation from the ideal at each characteristic frequency for each reference sample.

The final step in the present method is to establish a plurality of percent-deviation ranges, for example 0-5%, 0-10%, 0-25%, and 0-50%, and to determine for each set of percent-deviations how many normalized ratios fall within each such range. Then by determining which set demonstrates the numerically largest quantity of normalized ratios falling within each of the preestablished ranges, with appropriate weight given to the showing of larger numbers in the narrower ranges, it is possible to accurately select the set closest to the ideal, thus the reference sample which the unidentified sample most closely resembles.

EXAMPLE 1

A library of reference samples was assembled by the steps of preparing an infrared spectrum for each sample and determining pseudo absorptivities at the following characteristic frequencies (given to the nearest 5 cm.$^{-1}$):

| | | |
|---|---|---|
| 695 | 790 | 890 |
| 720 | 805 | 915 |
| 725 | 810 | 955 |
| 740 | 820 | 1020 |
| 765 | 835 | 1070 |
| 770 | 845 | 1145 |
| 780 | 870 | 1160 |

Thereafter, an infrared spectrum of an unidentified oil sample selected by another person from the same source as one of the reference samples was prepared and pseudo absorptivities were similarly determined at each of the above-listed characteristic frequencies. Although readings were taken at twenty one frequencies, because of the nature of the oil sample being measured, only an average of about 15 absorptivity readings were suitable for comparison.

For each reference sample, the ratio of the pseudo absorptivity of the unidentified sample to that of the reference was determined at each characteristic frequency. Each set of ratios was then normalized according to the method heretofore described to eliminate the factor of path lengths. The absolute value of the difference between each normalized ratio and 1.0 was determined and multiplied by 100 to obtain percent-deviations. For each set of percent-deviations it was determined how many percent-deviations fell within the percent-deviation ranges 0-5%, 0-10%, 0-25%, and 0-50%. These results are tabulated in Table 1 below.

TABLE 1

| Reference No. | Type | Percent-Deviation Ranges | | | | Total No. of Bands Compared |
|---|---|---|---|---|---|---|
| | | 0-5% | 0-10% | 0-25% | 0-50% | |
| 101 | crude | 3 | 4 | 14 | 14 | 15 |
| 102 | crude | 0 | 5 | 14 | 14 | 15 |
| 103 | crude | 4 | 6 | 13 | 14 | 15 |
| 104 | crude | 3 | 5 | 14 | 15 | 15 |
| 105 | crude | 2 | 7 | 14 | 15 | 15 |
| 106 | crude | 1 | 3 | 11 | 14 | 15 |
| 107 | crude | 6 | 9 | 12 | 15 | 15 |
| 108 | crude | 3 | 4 | 11 | 14 | 14 |
| 109 | crude | 4 | 10 | 14 | 15 | 15 |
| 110 | crude | 3 | 5 | 11 | 14 | 15 |
| 111 | crude | 10 | 12 | 15 | 15 | 15 |
| 112 | crude | 3 | 5 | 13 | 15 | 15 |
| 113 | crude | 5 | 10 | 11 | 13 | 15 |
| 114 | crude | 5 | 7 | 14 | 14 | 15 |
| 115 | crude | 4 | 4 | 13 | 14 | 15 |
| 116 | crude | 6 | 9 | 14 | 15 | 15 |
| 117 | crude | 4 | 8 | 13 | 14 | 14 |
| 118 | crude | 4 | 8 | 12 | 13 | 14 |
| 119 | crude | 0 | 4 | 13 | 14 | 15 |
| 120 | crude | 0 | 4 | 12 | 14 | 15 |
| 121 | crude | 1 | 2 | 5 | 12 | 14 |
| 122 | kerosene | 4 | 5 | 13 | 16 | 17 |
| 123 | kerosene | 4 | 8 | 12 | 16 | 17 |
| 124 | kerosene | 4 | 6 | 12 | 16 | 17 |
| 125 | kerosene | 1 | 3 | 11 | 16 | 17 |
| 126 | kerosene | 2 | 4 | 11 | 16 | 17 |
| 127 | No. 2 fuel | 2 | 5 | 15 | 16 | 16 |
| 128 | No. 2 fuel | 5 | 7 | 16 | 16 | 16 |
| 129 | No. 2 fuel | 7 | 7 | 14 | 16 | 16 |
| 130 | No. 2 fuel | 6 | 8 | 13 | 16 | 16 |
| 131 | No. 2 fuel | 4 | 6 | 13 | 15 | 16 |
| 132 | residual | 4 | 4 | 8 | 10 | 10 |
| 133 | residual | 4 | 8 | 9 | 9 | 9 |
| 134 | residual | 1 | 7 | 8 | 9 | 9 |
| 135 | residual | 2 | 9 | 9 | 9 | 9 |
| 136 | residual | 3 | 7 | 7 | 7 | 7 |

It will be observed that in both of the two narrowest percent-deviation ranges, 0–5% and 0–10%, the highest numerical correspondance occurs with Reference Sample No. 111. Furthermore, in the two broader ranges, 0–25% and 0–50%, the numerical correspondance of No. 111 compares favorably with other samples. In the 0–25% range, there are 15 matches for No. 111 compared with 16 matches for No. 128 and 15 for No. 127; in the 0–50% range, there are 15 matches for No. 111 compared with a maximum of 16 matches for Nos. 122–130. On this basis, it was correctly determined that the unidentified sample came from the same source as Reference Sample No. 111.

EXAMPLE 2

The procedure of Example 1 was repeated except that the unidentified oil sample was a true "unknown" collected from the Boston harbor. Eight of the most distinctive characteristic frequencies were used in this analysis with the results shown in Table 2 below.

TABLE 2

| Reference No. | Type | Percent-Deviation Ranges | | | |
|---|---|---|---|---|---|
| | | 0–5% | 0–10% | 0–25% | 0–50% |
| 101 | crude | 1 | 2 | 6 | 7 |
| 102 | crude | 2 | 3 | 6 | 7 |
| 103 | crude | 0 | 2 | 6 | 6 |
| 104 | crude | 2 | 4 | 6 | 7 |
| 105 | crude | 1 | 3 | 7 | 7 |
| 106 | crude | 2 | 2 | 6 | 7 |
| 107 | crude | 3 | 4 | 7 | 7 |
| 108 | crude | 2 | 4 | 7 | 7 |
| 109 | crude | 2 | 4 | 7 | 7 |
| 110 | crude | 2 | 2 | 5 | 7 |
| 111 | crude | 2 | 3 | 7 | 7 |
| 112 | crude | 2 | 4 | 6 | 7 |
| 113 | crude | 2 | 3 | 6 | 7 |
| 114 | crude | 2 | 2 | 6 | 6 |
| 115 | crude | 3 | 3 | 6 | 7 |
| 116 | crude | 1 | 3 | 7 | 7 |
| 117 | crude | 1 | 2 | 7 | 7 |
| 118 | crude | 2 | 3 | 5 | 6 |
| 119 | crude | 2 | 2 | 6 | 7 |
| 120 | crude | 2 | 3 | 6 | 6 |
| 121 | crude | 1 | 1 | 2 | 5 |
| 122 | kerosene | 3 | 3 | 5 | 7 |
| 123 | kerosene | 3 | 3 | 4 | 8 |
| 124 | kerosene | 2 | 3 | 7 | 8 |
| 125 | kerosene | 2 | 3 | 7 | 7 |
| 126 | kerosene | 2 | 3 | 4 | 8 |
| 127 | No. 2 fuel | 1 | 2 | 6 | 7 |
| 128 | No. 2 fuel | 1 | 3 | 7 | 7 |
| 129 | No. 2 fuel | 2 | 2 | 6 | 7 |
| 130 | No. 2 fuel | 2 | 3 | 6 | 7 |
| 131 | No. 2 fuel | 2 | 2 | 6 | 7 |
| 132 | residual | 2 | 3 | 7 | 7 |
| 133 | residual | 3 | 3 | 5 | 6 |
| 134 | residual | 3 | 3 | 4 | 6 |
| 135 | residual | 1 | 4 | 6 | 6 |
| 136 | residual | 1 | 3 | 6 | 6 |
| 137 | residual | 4 | 7 | 8 | 8 |

It will be observed that in each of the three narrowest percent-deviation ranges, 0–5%, 0–10%, and 0–25%, Reference Sample No. 137 demonstrates the highest numerical correspondance. Although in the 0–50% range several other samples demonstrate total numerical correspondance of 8 matches for 8 frequencies analyzed, No. 137 is the only sample that demonstrates complete correspondence in the narrower 0–25% range. On this basis it was determined that the Boston harbor sample came from the same source as Reference Sample No. 137.

A particular advantage of the method of the present invention is that it readily lends itself to implementation, at least in part, by a digital computer. It will be obvious to one skilled in the art that a computer can be programmed to perform one or more of the analytical data manipulation steps. For example, a computer can be programmed to analyze an infrared spectrum and to determine absorptivities at the predetermined characteristic frequencies. It is a particular advantage that these absorptivities for a plurality of reference samples can be stored in a memory bank which then serve as the library of reference samples for subsequent comparison to unidentified oil samples. The spectrum of an unidentified oil sample can then be analyzed by the computer and absorptivities at the characteristic frequencies determined. The computer can likewise be programmed to perform the subsequent operations in comparing the absorptivities of the unidentified sample to the reference samples as heretofore described and to generate a table showing the number of analyzed frequencies for each reference sample falling within pre-selected percent-deviation ranges. The resulting table can then be inspected to determine the closest correspondance between the unidentified sample and a reference sample. By computerizing the process of this invention as described above, the time required for matching an unidentified sample to a reference, including the preparation and measurement of an infrared spectrum of the unidentified sample, is less than one-half hour.

EXAMPLE 3

This test was conducted to determine the effects of weathering of an oil sample at sea on the accuracy of the present invention in determining the source of the spill and to demonstrate the use of a digital computer in the analysis.

A recent oil spill on Narragansett Bay was monitored for 30 days using infrared spectroscopy. All samples of the spill collected during this period were traced to the source of the spill by computer matching of their infrared spectra. Two subsequent oil slicks found in the same general area where shown to be from a different source by the same method of analysis. The original oil spill was the result of an oil tanker which struck an underwater object in Narragansett Bay approximately 10 miles from its destination in East Providence, Rhode Island. The tanker was extensively damaged and approximately 100,000 gallons of No. 6 grade fuel were released into the Bay. Less than 48 hours after the spill occurred, samples of the oil were collected from the beaches and shallow waters near the shore.

Infrared spectra of the samples taken from the tanker, the beaches, and the water were recorded on a Perkin Elmer Model 521 infrared spectrometer. Samples were taken from the beaches and water were collected in bottles and on aluminum foil as hereinafter described. Because oils adhere to the aluminum foil whereas water is repelled, the use of aluminum foil or other hydrophobic materials has been found to be a valuable technique for obtaining spectra of oil-water emulsions. Although most of the spectra were measured using AgCl cells, spectra of samples that were saturated with water were measured using the aluminum foil technique.

Twenty-one selected bands or frequencies between 650 and 1200 cm.$^{-1}$ were used for the identification. For each of the reference samples the percent transmittances of the 21 frequencies were converted into pseudo absorptivities, and these were stored in the data bank of a digital computer. If a band was not observed it was given a zero absorptivity and was eliminated from the analysis. To match an unidentified sample with the correct reference sample the following procedure was carried out: the absorptivities of the bands in the spectrum of the unidentified sample were determined, the ratios of the absorptivities for the unidentified sample to those of each reference were calculated, these ratios were averaged and normalized for each reference sample for which data had been stored in the computer file, the percent difference between this normalized ratio and 1.0 was determined, and finally the number of bands with a percent difference less than a certain value (e.g., 5, 10, 25%) was listed. The unidentified sample was considered matched to a reference sample when most of its bands fell within the 5 or 10% range.

To monitor the spill on Narragansett Bay a large sample of oil was obtained from the tanker involved in the accident. The infrared spectrum of this sample was recorded and the required data stored along with the data of 37 reference samples in the computer data bank. Spectra in the 650 to 1200 cm.$^{-1}$ region of a sample from the tanker and three samples taken from Narragansett Bay during the 30 days following the accident were prepared. The only major visual changes in the spectra after 30 days of weathering were the shapes of the valleys at 1020 and 1070 cm.$^{-1}$. Even the weak valley and shoulders below 900 cm.$^{-1}$ remained essentially constant with weathering.

The computer analysis of 10 samples taken from the Bay during the 30 day period are presented in Table 3 below. Each of these field samples was compared with 38 reference samples of crude oils and their distillate products. The number of characteristic frequencies showing a percent-deviation less than 10% are listed. The reference sample taken from the tanker is No. 138. Comparison of the field samples with this reference was almost perfect in all cases. Even after 30 days of weathering 9 out of 9 frequencies compared within the 10% range. It should be noted that the field samples also compared favorably with reference Nos. 101, 107, and 129; however, the comparison with No. 138 was better in all cases.

TABLE 3

| Known Reference No. | Number of Bands within %-Deviation < 10% Number of Days From Original Spill | | | | | | | | | |
|---|---|---|---|---|---|---|---|---|---|---|
| | 2 | 3 | 6 | 7 | 8 | 10 | 12 | 13 | 22 | 31 |
| 101 | 6 | 5 | 6 | 6 | 6 | 7 | 3 | 3 | 3 | 5 |
| 102 | 2 | 1 | 1 | 2 | 2 | 2 | 1 | 2 | 0 | 1 |
| 103 | 1 | 2 | 1 | 2 | 2 | 3 | 1 | 3 | 2 | 1 |
| 104 | 1 | 2 | 1 | 1 | 1 | 2 | 2 | 2 | 0 | 1 |
| 105 | 3 | 2 | 1 | 2 | 3 | 3 | 2 | 3 | 1 | 3 |
| 106 | 3 | 3 | 3 | 3 | 2 | 3 | 3 | 1 | 1 | 2 |
| 107 | 6 | 6 | 6 | 6 | 6 | 6 | 4 | 3 | 3 | 5 |
| 108 | 3 | 2 | 2 | 3 | 3 | 3 | 5 | 3 | 1 | 1 |
| 109 | 4 | 3 | 4 | 4 | 3 | 3 | 0 | 3 | 1 | 4 |
| 110 | 0 | 1 | 0 | 1 | 0 | 1 | 1 | 2 | 0 | 0 |
| 111 | 2 | 1 | 1 | 2 | 2 | 2 | 1 | 1 | 2 | 1 |
| 112 | 3 | 2 | 2 | 2 | 2 | 2 | 1 | 3 | 0 | 2 |
| 113 | 5 | 5 | 5 | 5 | 5 | 3 | 2 | 4 | 3 | 4 |
| 114 | 3 | 3 | 3 | 3 | 3 | 3 | 2 | 2 | 1 | 1 |
| 115 | 1 | 1 | 0 | 2 | 1 | 2 | 1 | 2 | 0 | 0 |
| 116 | 4 | 6 | 7 | 5 | 4 | 5 | 3 | 5 | 2 | 5 |
| 117 | 5 | 5 | 5 | 5 | 5 | 4 | 3 | 2 | 2 | 4 |
| 118 | 3 | 2 | 3 | 3 | 3 | 3 | 3 | 2 | 1 | 2 |
| 119 | 2 | 3 | 2 | 2 | 2 | 3 | 1 | 2 | 1 | 1 |
| 120 | 2 | 2 | 2 | 1 | 0 | 1 | 2 | 1 | 2 | 1 |
| 121 | 0 | 0 | 0 | 1 | 2 | 1 | 0 | 2 | 1 | 1 |
| 122 | 3 | 0 | 3 | 3 | 2 | 3 | 2 | 0 | 1 | 2 |
| 123 | 2 | 3 | 2 | 2 | 3 | 1 | 2 | 3 | 1 | 0 |
| 124 | 5 | 6 | 3 | 4 | 3 | 4 | 5 | 5 | 4 | 2 |
| 125 | 3 | 4 | 3 | 0 | 1 | 1 | 2 | 2 | 1 | 2 |
| 126 | 2 | 1 | 2 | 3 | 2 | 3 | 2 | 1 | 0 | 0 |
| 127 | 2 | 2 | 2 | 2 | 2 | 2 | 2 | 1 | 2 | 1 |
| 128 | 4 | 3 | 4 | 2 | 2 | 3 | 4 | 3 | 2 | 2 |
| 129 | 6 | 4 | 5 | 4 | 5 | 6 | 4 | 4 | 3 | 5 |
| 130 | 3 | 4 | 3 | 3 | 3 | 3 | 2 | 3 | 3 | 2 |
| 131 | 2 | 2 | 2 | 1 | 2 | 1 | 1 | 3 | 1 | 1 |
| 132 | 3 | 2 | 2 | 2 | 2 | 3 | 2 | 3 | 2 | 1 |
| 133 | 3 | 4 | 3 | 4 | 4 | 3 | 3 | 2 | 2 | 3 |
| 134 | 1 | 1 | 0 | 1 | 0 | 1 | 0 | 1 | 2 | 0 |
| 135 | 2 | 3 | 2 | 2 | 2 | 3 | 3 | 2 | 0 | 1 |
| 136 | 2 | 1 | 1 | 2 | 2 | 2 | 2 | 0 | 1 | 2 |
| 137 | 1 | 1 | 1 | 1 | 1 | 1 | 2 | 1 | 0 | 1 |
| 138 | 10 | 9 | 10 | 10* | 10* | 8 | 9 | 7 | 7 | 9 |
| Number of Frequencies Compared | 10 | 9 | 10 | 10 | 10 | 10 | 10 | 7 | 8 | 9 |

*All frequencies within 5%

Subsequent to the original spill there were two additional minor oil slicks reported on Narragansett Bay. The first of these slicks, identified as sample A, occurred about 12 miles south of the original shore deposits. It was reported in the local press that this slick also came from the original spill, i.e., the tanker. Several samples of this new slick were obtained. Its spectrum was compared with a sample from the tanker. Careful visual comparison of the spectra seemed to indicate that the new sample was from a different origin. The major visual difference was the size of the two strong valleys occurring between 700 and 800 cm.$^{-1}$. Computer analysis according to the process of the present invention confirmed the visual observations, i.e., absorptivities of the characteristic frequencies in the spectrum of this new slick were considerably different from those of reference No. 138, the sample from the tanker.

A second subsequent oil slick, identified as sample B, was discovered on the Bay about a month later, and a spectrum of this spill indicated a close similarity to slick A. It was believed that the two came from the same location, and a reference sample was obtained from a suspected source. After weathering the reference sample from the suspect source on the roof of the laboratory for 14 days, its spectrum was very similar to those from slicks A and B. Computer analysis according to the method of the present invention confirmed that A and B were indeed from the suspected source.

SPECTROMETRY TECHNIQUES

Figure 4:
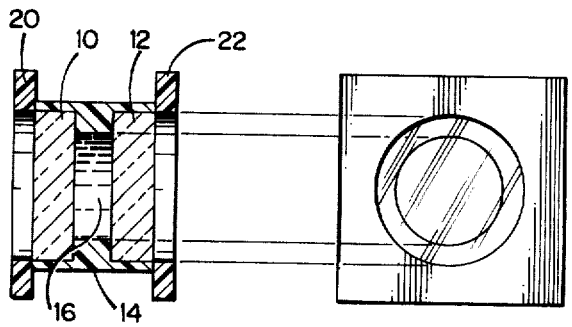
FIG. 4 illustrates a cross-section and a side view projection of a typical test cell for obtaining infrared spectra.

The basic technique of using a salt cell for preparing spectra of oil samples for the practice of the present invention is known in the art. FIG. 4 illustrates a cross-section and a side view projection of a typical cell. The cell comprises two thin, flat, circular and essentially transparent salt crystals or windows 10,12 separated by a circular washer or diaphragm 14 so as to define an enclosed cavity 16 of about 5 mm. in width. The crystals 10,12 are maintained in a fixed spatial relationship by support walls 20,22 which are attached by suitable means to the washer or diaphragm 14 and which contain circular slits or apertures of approximately the same size or larger than the circular faces of the windows 10,12 and are situated in direct alignment therewith so as to permit the passage of infrared light through the cell. To obtain an infrared spectrum, an oil sample is deposited in the cell cavity 16 by any suitable means, for example by syringe injection, and a beam of infrared light is directed in a straight line through one aperture of the cell walls, through the two salt windows and the oil sample contained therebetween, and out of the cell through the opposite cell wall aperture. The intensity of the emerging infrared beam is measured and recorded using suitable spectrometry equipment.

If it were possible to dispense with the salt windows which hold the oil sample in place, the resulting infrared spectrum would show a maximum intensity at some frequencies, defined as 100% transmittance, and intermediate intensities at other frequencies which represent partial absorbance by the oil at those frequencies. In practice, however, the thin salt windows comprising the test cells are not 100% transparent and cause a partial absorbance of the infrared beam. To accurately calibrate the spectra obtained using such cells, it is necessary to take into account this so-called "background" absorbance.

A variety of salts may be used in the preparation of oil test cells for infrared spectroscopy. Potassium bromide and silver chloride are especially desirable as "windows" because they produce a background absorbance which is essentially a linear function of frequency in the infrared frequency range of about 600-1200 cm.$^{-1}$. Therefore, for each cell it is necessary to take only a single reading of background absorbance before injecting the oil sample and running the analysis. On the other hand, whereas sodium chloride is by far the least expensive material for making cell windows, such windows demonstrate a background absorbance which is a non-linear function of frequency in the range of about 600–820 cm.$^{-1}$ and essentially constant in the range of about 820–1200 cm.$^{-1}$. In the past, the accurate calibration of a sodium chloride cell has necessitated making a reading of background absorbance at each characteristic frequency which is to be relied upon in analyzing an oil sample spectrum. It will be appreciated that this is a tedius, expensive and time-consuming process.

In accordance with the present invention, a method has now been developed by which a sodium chloride cell may be calibrated for background absorbance by means of a single pretest measurement. Broadly, this method comprises generating a cubic equation to define the background absorptivity of sodium chloride cells of a known thickness as a function of frequency, and thereafter determining the background absorptivity for a cell at each of the characteristic frequencies according to that equation. The cubic equation may be expressed in general terms as:

$$9' = c_0 + (c_1)f + (c_2)f^2 + (c_3)f^3$$

. (3)

wherein $a'$ = the absorptivity of a sodium chloride window at frequency $f$, and $c_o$, $c_1$, $c_2$, and $c_3$ are constants.

To initially generate the constants $c_i$, $c_1$, $c_2$, and $c_3$ for the cubic equation, a complete infrared spectrum of a sodium chloride window is prepared and the intensity is measured at a plurality of frequencies in the range of 600–800 cm.$^{-1}$. It has been found that from about 820 cm.$^{-1}$ to 1200 cm.$^{-1}$, the background intensity of sodium chloride windows is essentially constant. For the frequency range 600–820 cm.$^{-1}$, the constants for the cubic equation are then determined by fitting the equation to the measured values of $a'$ at the various selected frequencies using the method of "least squares". In any subsequent tests employing similar sodium chloride cells, the empty cell absorptivity $a'$ can be determined at each characteristic frequency from the cubic equation for frequencies in the range of 600–820 cm.$^{-1}$ and by assuming a constant value at characteristic frequencies above 820 cm.$^{-1}$. Background absorbance for the empty cell at each characteristic frequency is then determined from the background absorptivity and the thickness of sodium chloride windows, and the background intensity $I'$ is determined according to the relationship:

$$A' = -\log I'/I_o$$

. (4)

wherein $A'$ is background cell absorbance and $I_o$ is the intensity of the infrared beam passing through the empty cell at a frequency where the cell is non-abosrbing.

It should further be appreciated that the step of determing the background absorbance for sodium chloride cells, as many of the other steps in the present invention, readily lends itself to computer implementation. In particular, once the constants in the cubic equation are determined, these values may be stored in a memory bank and subsequently used to determine the background absorbance at each characteristic frequency of sodium chloride cells used for obtaining infrared spectra. This background absorbance is then taken into account in determining the pseudo absorptivities of the oil samples at each characteristic frequency.

Although test cells as heretofore described have generally been found to give the most satisfactory results whenever it is possible to obtain relatively pure oil samples for analysis, after weathering both in the laboratory and on the sea for a period of time, it is difficult to separate the oil from the water. The water and lighter oils form emulsions, whereas the water is occluded in the heavier oils. In both cases it is almost impossible to obtain an adequate spectrum. Various separation techniques have been tried including chemical extraction, vacuum distillation, and freeze drying to eliminate the water. However, all were unsuccessful and usually added or removed chemical components from the oil samples which reduced the accuracy of the resulting spectrum. A method has now been found to reduce the water to negligible amounts and to provide a new way to measure infrared spectra.

In accordance with this new and improved method, oil samples are collected by dipping aluminum foil or a similarly hydrophobic material into water containing the oil or by smearing the water-oil mixture on aluminium foil and aluminum the water to drip off. The oil has been found to adhere to the foil, whereas the water is repelled and will eventually drain off. In this way most of the water is eliminated from the samples.

Furthermore, the foil also serves as an excellent "sample cell" for oil samples. To eliminate the need for collecting the oil from the foil after the water drains off and transferring it to a cell, the spectrum can be measured by simply replacing one of the plane (flat) mirrors in the sample optical path with the oil-covered aluminum foil. In the previous tests using test cells, all of the spectra were recorded on a Perkin Elmer Model 521 infrared spectrometer. This instrument has only one small plane mirror in the sample optical path, but this mirror is inconvenient to reach and adjust. Since it was not desirable to disturb the permanent optical alignment of this instrument, instead a Wilks Model 45 Universal Micro Sampling System was employed. This sampling system is designed to obtain spectra micro samples and attenuated total reflection spectra. However, in the present work, the system was modified to suit the purposes of this invention.

Figure 5:
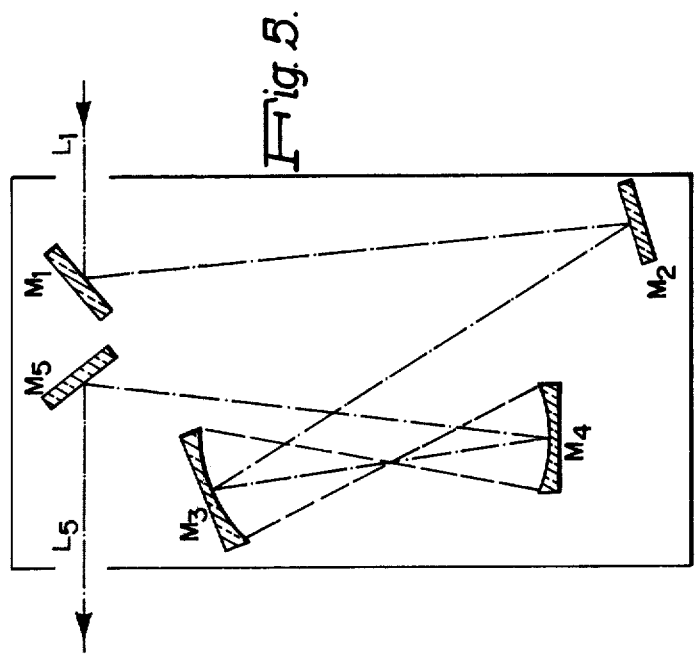
FIG. 5 is a schematic diagram of the internal structure of one form of infrared spectometry apparatus.

FIG. 5 illustrates the optical diagram for the micro sampling system. As shown by arrow $L_1$, infrared light from the source is reflected by mirrors $M_1$ and $M_2$ into the beam condenser portion of the system ($M_3$ and $M_4$). Mirror $M_5$ reflects the light $L_5$ back into the monochromator. For the present experiments with oil on aluminum foil, a plate from a one-eighth inch aluminum sheet was machined to the exact size and shape of the plane mirror $M_2$ and $M_2$ was then replaced with this plate which serves as a backing for the aluminum foil.

To obtain a spectrum of an oil sample on aluminum foil, the foil is placed on the backing plate with its shiny, oil-coated surface toward the light beam, i.e., the foil is used as a reflector surface replacing mirror $M_2$. All mirrors including the aluminum foil-covered plate at $M_2$ are adjusted in the prescribed manner to give a maximum transmitted signal at 2000 cm.$^{-1}$ (a frequency at which the oil does not absorb), and a spectrum is recorded in the usual manner.

EXAMPLE 4

To demonstrate the capabilities of aluminum foil in separating oil and water and subsequently using the oil-coated foil as a "sample cell" in the manner previously described, two infrared spectra of the same field sample were prepared. The sample had weathered on the open sea for more than 10 days and was found to contain a large amount of entrained water. One sample was tested using a conventional silver chloride test cell while the other sample was obtained and tested on a strip of aluminum foil. The infrared spectrum obtained using the silver chloride cell was of very poor quality due to the presence of water which made it difficult to accurately measure absorbance at characteristic frequencies where valleys or shoulders were not clearly resolved. On the other hand, the infrared spectrum obtained using the aluminum foil was more distinct and more easily measured.

It should be emphasized that this method gives transmission and not reflection spectra. The light is transmitted through the oil film (or absorbed by it), reflected by the aluminum foil, and transmitted back through the oil film to the next mirror in the optical system. Thus, the light passes through the oil twice (i.e., the effective sample path length is doubled), and the absorption of each band is increased.

Although the present invention has been described by reference to specific examples and drawings, it will be apparent to those skilled in the art that various changes and modifications may be made therein without departing from the spirit of the invention.

Having described the invention, what is claimed is:

1. A method of comparing an unidentified oil sample to a set of reference oil samples which comprises the steps of:
   a. preparing infrared spectra of the various oil samples;
   b. selecting a plurality of characteristic frequencies in said infrared spectra and determining the absorptivity for each spectrum at each characteristic frequency, said absorptivities defining for each reference sample a set of ratios of absorptivities of the unidentified sample to the reference sample at each characteristic frequency;
   c. for each reference sample, determining the average of the ratios in said set of ratios and thereafter generating a normalized ratio for each reference sample at each characteristic frequency by dividing each ratio in said set of ratios by said average ratio of the set;
   d. for each reference sample and for each characteristic frequency thereof, determining the absolute value of the difference between said normalized ratio and 1.0 and multiplying that difference by 100 to generate a percent-deviation for each characteristic frequency of each reference sample;

e. establishing a plurality of percent-deviation ranges and determining for each set of normalized ratios the number of ratios having a percent-deviation falling within each of said percent-deviation ranges; and, f. determining on the basis of the largest numerical quantity of characteristic frequencies falling within said percent-deviation ranges the reference sample which the unidentified sample most closely approximates.

2. The method of claim 1 wherein said infrared spectra of the various oil samples are prepared by the steps of:

a. contacting a clean strip of aluminum foil with an aqueous mixture comprising at least in part the oil sample to be tested thereby coating the surface of the aluminum foil with a thin film of said oil and thus separating it from the aqueous mixture; and, b. employing the surface of the aluminum foil which has been coated with the oil sample to be tested as at least one reflecting surface to reflect infrared light and thereafter measuring the intensity of the light so reflected so as to generate an infrared spectrum over the frequency range of about 600 to 1200 cm.$^{-1}$.

3. The method of claim 1 wherein the absorptivities of a plurality of reference oil samples at said plurality of characteristic frequencies are determined in advance and are stored in the data bank of a digital computer.

4. The method of claim 3 wherein the infrared spectrum of an unidentified oil sample is introduced into said digital computer for comparison with said reference oil samples.

5. The method of claim 4 wherein the analytical operations are performed by a digital computer.

6. The method of claim 1 wherein said infrared spectra of the various oil samples are prepared by the steps of:

a. depositing an oil sample essentially free of water in a sodium chloride cell comprising two essentially transparent crystals of sodium chloride maintained in a fixed spaced relationship to one another by suitable means; and, b. passing infrared light through said sodium chloride cell and said oil sample contained therein and measuring the intensity of the infrared light emerging from said cell so as to generate an infrared spectrum over the frequency region of about 600 to 1200 cm.$^{-1}$.

7. The method of claim 6 wherein the absorptivities of the various oil samples at each of the characteristic frequencies are determined from the actual absorbances of the samples at each of said frequencies and said actual absorbances are determined by the steps comprising:

a. determining the absorptivities of an empty sodium chloride window at a plurality of frequencies between about 610 to 820 cm.$^{-1}$;

b. generating a cubic equation to define the background absorptivities of each sodium chloride window over the range of about 610 to 820 cm.$^{-1}$ by fitting said absorptivities determined at a plurality of frequencies between 610 to 820 cm.$^{-1}$ to a cubic equation by the method of least squares;

c. determining the background absorbances of the sodium chloride cell by means of said cubic equation for frequencies in the range of about 610 to 820 cm.$^{-1}$ and by assuming a constant background absorbance in the frequency range of about 820 to 1200 cm.$^{-1}$; and, d. determining the actual absorbance of each oil sample at each of said characteristic frequencies from the measured absorbance at each frequency and corresponding background absorbance of the sodium chloride cell.

8. The method of claim 7 wherein the absorptivities of a plurality of reference oil samples at said plurality of characteristic frequencies are determined in advance and are stored in the data bank of a digital computer.

9. The method of claim 8 wherein said cubic equation is determined and stored in the data bank of said digital computer.

10. The method of claim 9 wherein the infrared spectrum of an unidentified oil sample is introduced to said digital computer for comparison with said reference oil samples.

11. The method of claim 10 wherein the analytical operations are performed by a digital computer.

* * * * *

UNITED STATES PATENT AND TRADEMARK OFFICE
CERTIFICATE OF CORRECTION

PATENT NO. : 3,896,312
DATED : July 22, 1975
INVENTOR(S) : Christopher W. Brown et al.

It is certified that error appears in the above-identified patent and that said Letters Patent are hereby corrected as shown below:

Col. 1, line 16 - "spactroscopy" should be -- spectroscopy --.
Col. 1, lines 33-34 - "an practical scale as, for example, in tracing the source of" should be deleted.
Col. 3, line 8 - "sample" should be -- samples --.
Col. 5, line 29 - after "0-5%." the period "." should be a comma -- , --.
Col. 7, line 67 - "itseft" should be -- itself --.
Col. 8, line 45 - after "fuel" insert -- oil --.
Col. 10, lines 5-6 - "valley" should be -- valleys --.
Table 3, Ref. No. 121, band 8, "2" should be -- 0 --.
Table 3, Ref. No. 121, band 10, "1" should be -- 2 --.
Table 3, Ref. No. 121, band 12, "0" should be -- 1 --.
Table 3, Ref. No. 121, band 13, "2" should be -- 0 --.
Col. 12, equation (3), "9'" should be -- a' --.
Col. 12, line 42 - "$c_i$, $c_1$, $c_2$, and $c_3$" should be -- "$c_0$", "$c_1$", "$c_2$", and "$c_3$" --.

Col. 13, lines 38-39 - "aluminium foil and aluminum" should be -- aluminum foil and allowing --.

Signed and Sealed this sixth Day of January 1976

[SEAL]

Attest:

RUTH C. MASON
Attesting Officer

C. MARSHALL DANN
Commissioner of Patents and Trademarks